United States Patent [19]
Smith

[11] Patent Number: 6,114,972
[45] Date of Patent: Sep. 5, 2000

[54] ELECTROMAGNETIC RESISTIVITY TOOL AND METHOD FOR USE OF SAME

[75] Inventor: Harrison C. Smith, Anna, Tex.

[73] Assignee: Halliburton Energy Services, Inc., Dallas, Tex.

[21] Appl. No.: 09/009,322

[22] Filed: Jan. 20, 1998

[51] Int. Cl.$^7$ .................................................. G01V 3/00
[52] U.S. Cl. ...................... 340/854.6; 324/366; 324/368; 367/31
[58] Field of Search ......................... 340/854.6; 324/339, 324/341, 366, 303, 338, 340, 354, 368; 367/31

[56] References Cited

U.S. PATENT DOCUMENTS

| | | | |
|---|---|---|---|
| 2,354,887 | 8/1944 | Silverman et al | 177/352 |
| 2,364,957 | 12/1944 | Douglas | 175/182 |
| 2,400,170 | 5/1946 | Silverman | 177/351 |
| 2,425,868 | 8/1947 | Dillon | 177/352 |
| 3,831,138 | 8/1974 | Rammner | 340/18 |
| 4,149,698 | 4/1979 | Deaton | 251/63.6 |
| 4,432,077 | 2/1984 | Alhilali et al. | 367/31 |
| 4,622,518 | 11/1986 | Cox et al. | 324/341 |
| 4,630,243 | 12/1986 | MacLeod | 367/82 |
| 4,656,422 | 4/1987 | Vail, III et al. | 324/303 |
| 4,700,141 | 10/1987 | Cox et al. | 324/341 |
| 4,724,385 | 2/1988 | Vail, III | 324/303 |
| 4,748,415 | 5/1988 | Vail, III | 324/339 |
| 4,780,679 | 10/1988 | Kenyon et al. | 324/339 |
| 4,852,067 | 7/1989 | White | 367/31 |
| 4,901,023 | 2/1990 | Vail, III | 324/339 |
| 5,065,100 | 11/1991 | Vail, III | 324/339 |
| 5,091,725 | 2/1992 | Gard | 340/854.1 |
| 5,260,661 | 11/1993 | Vail, III | 324/339 |
| 5,633,590 | 5/1997 | Vail, III | 324/368 |
| 5,883,516 | 3/1999 | Van Steenwyk et al. | 324/366 |

FOREIGN PATENT DOCUMENTS

WO 98/06924  2/1998  WIPO.

*Primary Examiner*—Michael Horabik
*Assistant Examiner*—Albert K. Wong
*Attorney, Agent, or Firm*—Paul I. Herman; Lawrence R. Youst

[57] ABSTRACT

An apparatus for obtaining resistivity readings of the earth surrounding a wellbore (32) to determine the downhole location of the apparatus or to generate a log is disclosed. The apparatus comprises an electromagnetic transmitter (40) for transmitting electromagnetic waves (42, 46) into the earth and an electronics package (122). The electronics package includes a power source (200) providing a current to the electromagnetic transmitter (40), a current sensing device (204) for detecting the current drawn by the electromagnetic transmitter (40), a sample and hold circuit (210) for sampling the current drawn by the electromagnetic transmitter (40) and a memory device (214) for storing the current draw information.

19 Claims, 6 Drawing Sheets

ELECTROMAGNETIC RESISTIVITY TOOL AND METHOD FOR USE OF SAME

TECHNICAL FIELD OF THE INVENTION

This invention relates in general to downhole tools and, in particular to, a downhole tool for generating electromagnetic waves to determine the resistivity of the earth surrounding a wellbore.

BACKGROUND OF THE INVENTION

Without limiting the scope of the invention, its background is described in connection with transmitting downhole data to the surface during well logging and during the placement of downhole tools such as packers, perforating guns, valves and similar devices, however, it should be noted that the principles of the present invention are applicable throughout the life of a wellbore.

During the drilling, completion and operation of a typical hydrocarbon well, various tools are placed downhole for operations such as packing, perforating and well control. The tools may be packers, perforating guns, flow control devices and the like. Placing the tools in the correct location is a key consideration in successful well operation. Misplacement of a tool can result in multiple trips down the well to retrieve and/or reposition the tool in the correct location as well as repairing any damage to the wellbore or casing resulting from, for example, the discharge of a perforating gun outside of the desired zone. The placement of downhole tools consequently represents an important step in the completion and operation of an oil or gas well. Therefore, from an economic standpoint, it is critical that the tools used to complete and produce a well are correctly placed.

While a number of techniques have been utilized to transmit downhole data such as temperatures, pressures and the like to the surface, these methods have not been exploited in connection with downhole logging and tool placement. In particular, one technique utilized to telemeter downhole data to an operator on the surface is based upon the generation and propagation of electromagnetic waves. Electromagnetic waves may be produced by inducing an axial current into, for example, the production casing or drill string. The axially induced current produces electromagnetic waves including an electric field and a magnetic field, formed at right angles to each other. The axial current impressed on the casing or drill string is modulated with data causing the electric and magnetic fields to expand and collapse, creating a means by which data may be propagated and intercepted by a receiving system. The receiving system is typically positioned at ground level or, in the case of offshore operations, at the sea floor, where the electromagnetic signal is picked up and recorded.

The intensity of the electromagnetic signal at a given distance from the telemetry tool is directly related to the distance of transmission, the characteristics of the media through which the signal is propagated and other factors. The intensity of electromagnetic waves transmitted through the earth strata is dependent upon the skin depth ($\delta$) of the media through which the electromagnetic waves travel. Skin depth is defined as the distance at which the power from a downhole signal will attenuate by a factor of 8.69 db. (approximately seven times decrease from the initial power input), and is primarily dependent upon the frequency (f) of the transmission and the conductivity ($\sigma$) of the media through which the electromagnetic waves are propagating. For example, at a frequency of 10 Hz, and a conductance of 1 mho/meter (1 ohmmeter), the skin depth would be 159 meters (522 feet) Therefore, for each 522 feet in a consistent 1 mho/meter media, an 8.69 db loss occurs. Skin depth may be calculated using the following equation.

Skin Depth=$\delta=1/\sqrt{(\pi f \mu \sigma)}$ where:
   n=3.1417;
   f=frequency (Hz);
   $\mu$=permeability ($4\pi \times 10^6$); and
   $\sigma$=conductance (mhos/meter).

As should be apparent, the higher the conductance of the media through which the electromagnetic waves are propagated, the lower the frequency must be to achieve the same transmission distance. Likewise, the lower the frequency, the greater the distance of transmission with the same amount of power. In any case, the current flow or current drain during the transmission is proportional to the conductivity of the media surrounding the telemetry tool. Thus, the use of electromagnetic telemetry provides an opportunity to meet an existing need for an accurate, reliable and economical means of determining the location of a tool in a wellbore.

SUMMARY OF THE INVENTION

The present invention disclosed herein comprises a downhole telemetry tool including an electromagnetic transmitter for determining the location of the downhole tool utilizing Ultra Low Frequency ("ULF") to Very Low Frequency ("VLF") electromagnetic waves. The method and apparatus of the present invention also provide for the generation of a resistivity log that may be obtained as the result of the natural transmission characteristics of an electromagnetic data transmission system. The resistivity log may be generated when tripping into or out of the wellbore.

Electromagnetic waves in the ULF range, 0.0001 Hz to 20 Hz, will penetrate the earth media at a very great depth, resulting in a broad band resistance. Due to the transmission characteristics of ULF electromagnetic waves, the load presented by the surrounding media and measured by the telemetry tool is not greatly affected by the presence of casing which provides a constant load. Thus, as the apparatus and method of the present invention contemplate the use of ULF electromagnetic transmissions in both open and cased boreholes.

Increasing the frequency of the electromagnetic waves to the VLF range, 3 Khz to 30 KHz, narrows the bandwidth and provides a more definitive signal as the waves propagate through the surrounding media. In either case, the transmission of both ULF and VLF electromagnetic waves results in an electrical current draw upon the transmitting electronics that is inversely proportional to the resistivity of the surrounding media, thus enabling the creation of a resistivity log or the identification of the surrounding media based upon prior resistivity logging of the strata through which the wellbore extends. Thus, the operator, by comparing real time readings against a previously obtained resistivity log, may set tools such as packers, perforating guns, sensors, flow control devices and the like in the desired zone. The operator may take ULF readings first to obtain a general location and then use VLF readings to more accurately position the particular tool.

In one embodiment of the present invention, each time the electromagnetic telemetry system is used to transmit a data stream to the surface, the load (current draw) on the telemetry tool is measured using a current sensing circuit device incorporated in the downhole electronics unit. The measurement is stored and transmitted to the surface with the next data transmission.

In the method of the present invention, the location of a downhole tool is determined via the electromagnetic field load placed across an electrically isolated portion of a work string. The isolated portion of the drill string is separated from the remainder of the string by a dielectric material such as an oxide resin or thermoset resin, selected for its dielectric properties and capability of withstanding extrusion.

The downhole telemetry tool of the present invention comprises a housing having first and second subassemblies that are electrically isolated from one another. In one embodiment, an isolation subassembly is disposed between the first and second subassemblies using a dielectric layer positioned between the isolation subassembly and both the first subassembly and the second subassembly. The transmitter also includes a mandrel that is coaxially disposed within the housing. The mandrel is electrically isolated from the first subassembly with one or more dielectric layers and is electrically coupled to the second subassembly. In one embodiment, the mandrel includes a first section and a second section which are electrically isolated from one another by a dielectric material.

An important factor in measuring the electrical load across the gap is the length and radius of the collar, drill string or pipe below the gap, referred to as the electrode. The length and radius of the electrode, in combination with the skin depth and conductivity of the surrounding media is characterized by an impedance Z across the gap that is proportional to the resistivity of the media through which the electromagnetic wave travels. The impedance may be approximated through the use of the following equation:

$Z=-\ln(R/\delta)/(2\pi\sigma L)$ where:

$\pi=3.1417$;

$\delta$=skin depth;

$\sigma$=conductivity (mhos/meter);

R=radius of the electrode; and

L=length of the electrode.

Thus, the conductance, or inversely, the resistivity of the media surrounding the electromagnetic telemetry tool may be determined. Also, by comparing the resistivity of the media with prior resistivity log records, the location of the telemetry tool can be determined on a real time basis. The apparatus and method of the present invention, by comparing real time readings against previously obtained resistivity logs, enable the operator to set and place packers, perforating guns and other devices in the desired downhole location or zone. In addition, the apparatus and method of the present invention provide for real time communication between downhole equipment and the surface using electromagnetic waves to carry the information. Alternatively, the information may be telemetered to surface using electromagnetic or acoustical waves or via a hardwired connection to a surface location. The apparatus of the present invention may be conveyed downhole on a wire line or may be configured as a tubing retrievable device. In either case, the apparatus and method of the present invention provide an economical and reliable means of locating downhole tools in the desired location, thereby minimizing the need for multiple trips to place tools in a wellbore.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
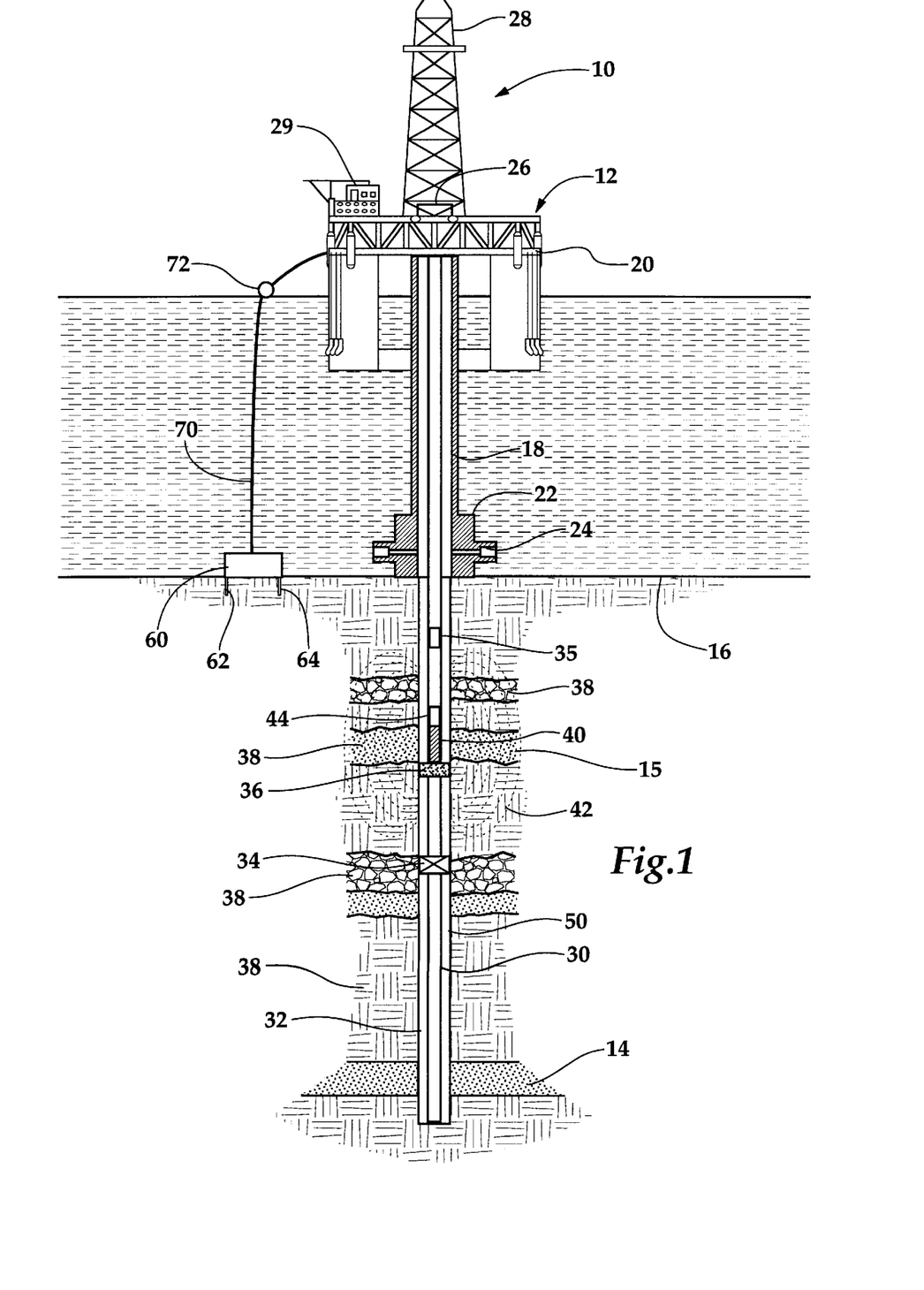
FIG. 1 is a schematic illustration of an offshore oil or gas drilling platform utilizing the apparatus and method of the present invention to locate a desired zone for placement of a downhole tool.

Referring to FIG. 1, an offshore oil and gas drilling apparatus is schematically illustrated and generally designated 10. A semi-submergible platform 12 is centered over a submerged oil and gas formation 14 located below sea floor 16. A subsea conduit 18 extends from deck 20 of platform 12 to wellhead installation 22 including blowout preventers 24. Platform 12 has hoisting apparatus 26 and a derrick 28 for raising and lowering drill string 30 in wellbore 32.

Wellbore 32 penetrates and passes through a plurality of different strata or zones 38. During the completion or operation of the well, a variety of downhole tools such as packer 34 and perforation gun 36 are placed downhole to perform various operations such as isolating portions of wellbore 32 or perforating the casing 50 in order to produce from a selected zone. As will be appreciated by those skilled in the art, accurate placement of these tools is important to avoid multiple tool resets and/or multiple trips down the wellbore 32.

Electromagnetic telemetry tool 40 of the present invention is positioned adjacent to a tool, such as a perforating gun 36, in a first downhole location 15. Although the electromagnetic telemetry tool 40 is shown adjacent to the perforating gun 36, it will be appreciated by those skilled in the art that telemetry tool 40 may be positioned a known distance above or below perforating gun 36 along drill string 30. Telemetry tool 40 is capable of transmitting multiple frequencies ranging between, for example 1 Hz (ULF) and 20 KHz (VLF). Telemetry tool 40 may be equipped to receive transmissions from a surface transmitter 29 for two way communications between platform 12 and downhole locations as required.

Generation of electromagnetic waves 42 is enhanced by positioning telemetry tool 40 in an electrically isolated portion of the drill string 30 separated by a nonconductive gap 44 from the uphole portion of drill string 30. Telemetry tool 40 is powered by a battery pack which may include a plurality of batteries, such as nickel cadmium or lithium batteries, which are configured to provide proper operating voltage and current.

ULF electromagnetic waves 42 generated by the telemetry tool 40 travel through the earth and are received by electromagnetic pickup device 60 located on sea floor 16. Electromagnetic pickup device 60 may sense either the electric field or the magnetic field of electromagnetic wave fronts 42 using an electric field sensor 62 or a magnetic field sensor 64 or both. The electromagnetic pickup device 60 serves as a transducer transforming electromagnetic wave fronts 42 into an electrical signal using a plurality of electronic devices. The electrical signal may be sent to the surface on wire 70 that is attached to buoy 72 and onto platform 12 for processing. Upon reaching platform 12, the transmitted information, including the current draw from the prior transmission, is processed making any necessary adjustments, calculations and error corrections such that the information may be displayed in a usable format to determine the downhole location of, for example, perforating gun 36. Additionally, parameters such as pressure and temperature as well as a variety of other environmental information may be obtained by sensors (not shown) and transmitted via electromagnetic wave fronts 42 generated by telemetry tool 40.

In some instances it may be desirable to place a tool at a depth such that signal strength of the electromagnetic wave fronts 42 generated by telemetry tool 40 is not sufficient for detection at the sea floor 16. In these instances, one or more repeaters 35 may be interposed along the drill string 30 and sea floor 16 to receive, amplify and retransmit the signals. Repeaters 35 may utilized electromagnetic waves, acoustical waves or both depending upon the depth of the wellbore 32 and the desired location and the particular strata through which wellbore 32 extends.

Even though FIG. 1 depicts a single repeater 35, it should be noted by one skilled in the art that the number of repeaters will be determined by the depth of wellbore 32, the noise level in wellbore 32 and the characteristics of the earth's strata adjacent to wellbore 32 in that electromagnetic waves suffer from attenuation with increasing distance from their source at a rate that is dependent upon the composition characteristics of the transmission medium and the frequency of transmission. For example, repeaters 35 may be positioned between 3,000 and 5,000 feet apart. Thus, if wellbore 32 is 15,000 feet deep, between two and four repeaters 35 would be desirable. Additionally, as will be appreciated by those skilled in the art, telemetry tool 40 of the present invention may be incorporated as part of one or more of repeaters 35 if desired.

The current draw by telemetry tool 40 during the generation of electromagnetic wave fronts 42 may be stored and transmitted to the surface immediately or with the next data transmission. The current draw is used to determine the resistivity of the medium at 15. The current draw information to is transmitted to the surface for comparison with prior resistivity log records to determine the location of the tool 36. Based upon the results of the comparison, perforating gun 36 may be repositioned in the desired location.

Figure 2:
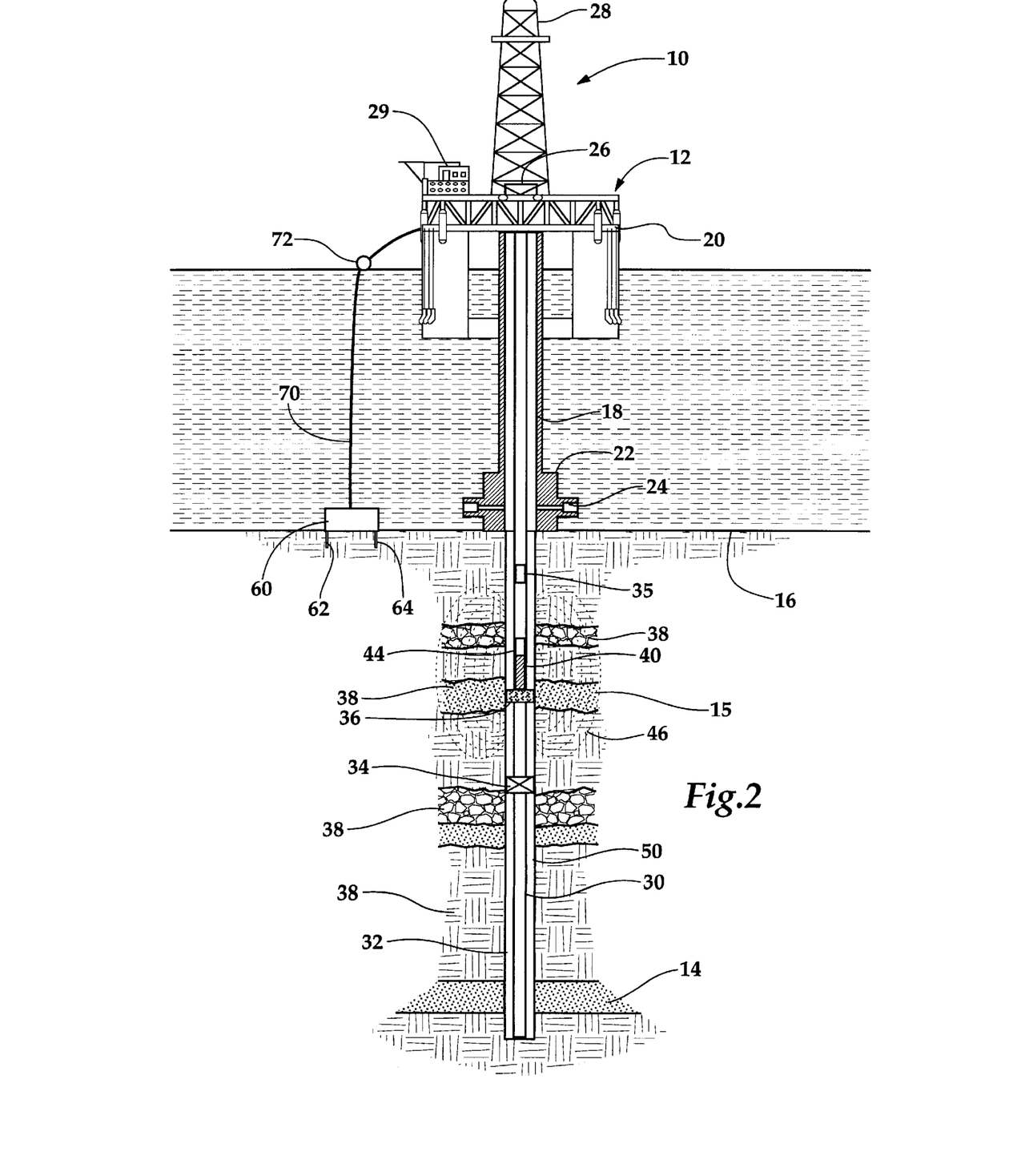
FIG. 2 is a schematic illustration of an offshore oil or gas drilling platform utilizing the apparatus and method of the present invention to adjust the location of a downhole tool after the location of the desired zone has been determined.

Referring now to FIG. 2, perforating gun 36 has been repositioned in zone 15 is based upon the previously obtained resistivity readings. To increase the precision of the positioning of telemetry tool 40 and thereby perforating gun 36, telemetry tool 40 may generate VLF waves 46 at a frequency of, for example, 20 KHz. The resistivity information obtained using VLF waves 46 will be stored and may be transmitted to electromagnetic pickup device 60 using ULF electromagnetic wave fronts 42 as described with reference to FIG. 1. As previously noted, electromagnetic pickup device 60 may sense either the electric field or the magnetic field of electromagnetic wave fronts 42 utilizing an electric field sensor 62 or a magnetic field sensor 64 or both. The electromagnetic pickup device 60 converts electromagnetic wave fronts 42 into electrical signals using a plurality of electronic devices. The electrical signal may be sent to the surface on wire 70 that is attached to buoy 72 and onto platform 12 for processing. Upon reaching platform 12, the transmitted information, including the current draw during the transmission of VLF waves 46, is processed making any necessary adjustments, calculations and error corrections such that the information may be displayed in a usable format to determine the location of perforating gun 36.

Even though FIGS. 1 and 2 have been described with reference to transmitting electromagnetic waves in the ULF range and the VLF range, it should be understood by one skilled in the art that telemetry tool 40 of the present invention is equally well-suited for transmitting electromagnetic waves in other frequency ranges including, but not limited to, the low frequency range, 30 KHz to 300 KHz, the medium frequency range, 300 KHz to 3 MHz and the high frequency range, 3 MHz to 30 MHz. Additionally, it should be noted that transmitting electromagnetic waves in such higher frequency ranges will yield greater precision for downhole positioning and greater sensitivity for a downhole resistivity log.

Figure 3A:
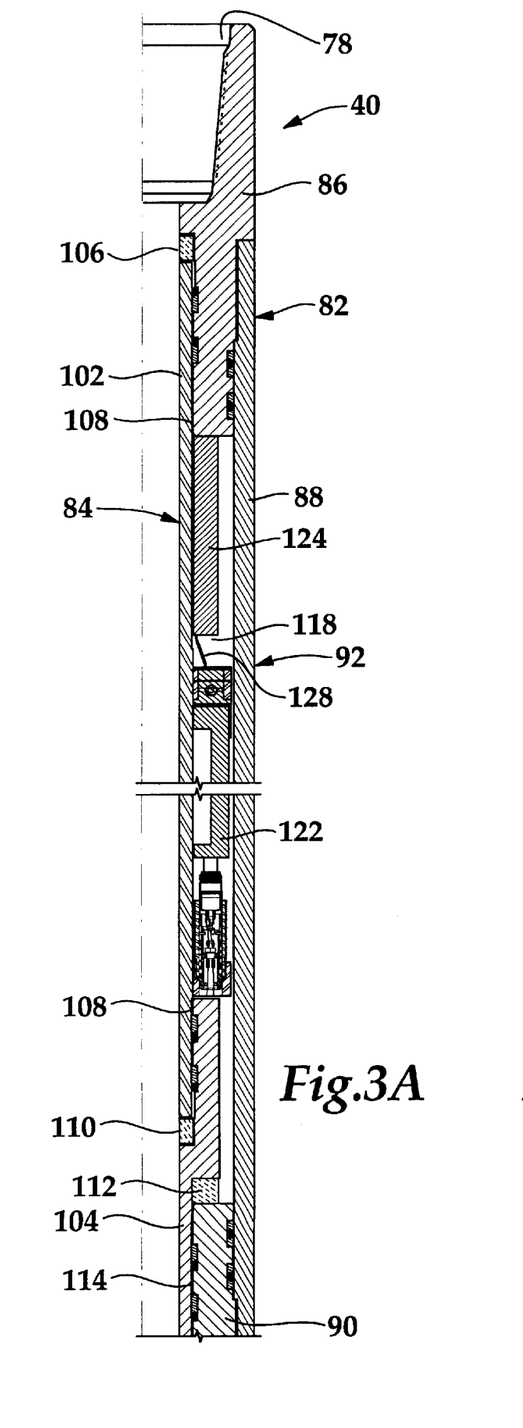
FIGS. 3A and 3B are quarter sectional views of one embodiment of the telemetry tool of the present invention.
Figure 3B:
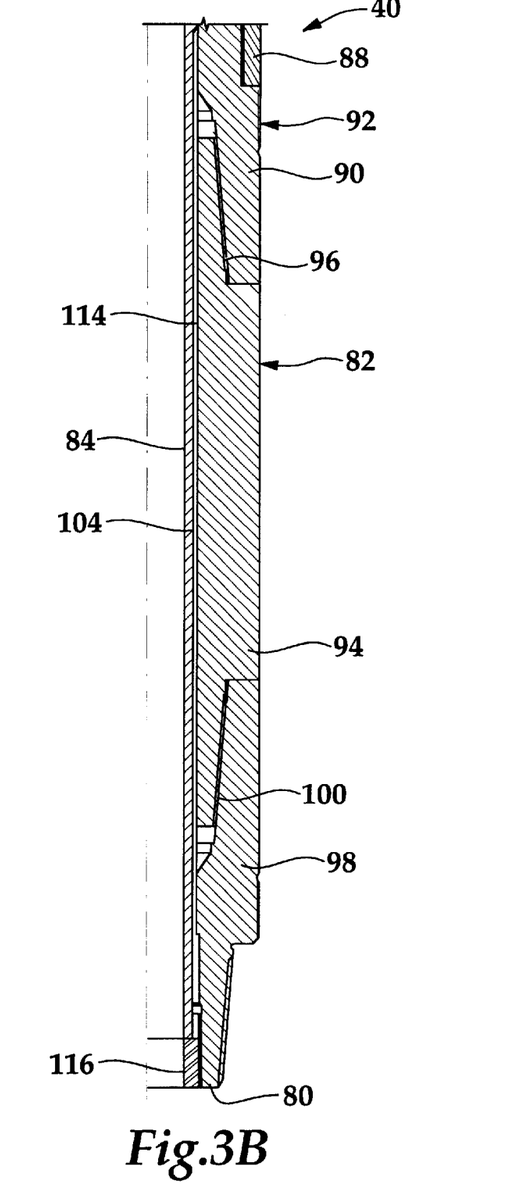

Representatively illustrated in FIGS. 3A and 3B is one embodiment of an electromagnetic telemetry tool 40 of the present invention. For convenience of illustration, FIGS. 3A and 3B depict telemetry tool 40 in a quarter sectional view. Telemetry tool 40 has a box end 78 and a pin end 80 such that telemetry tool 40 is threadably adaptable to drill string 30. In one embodiment, telemetry tool 40 has an external housing 82 and a mandrel 84 having a full bore enabling the circulation of fluids therethrough. Housing 82 and mandrel 84 protect the components of telemetry tool 40 from fluids disposed within wellbore 22 and within drill string 30.

Housing 82 of telemetry tool 40 includes an axially extending and generally tubular upper connecter 86 including box end 78. Upper connecter 86 is normally sealed and connected to drill string 30 for conveyance into wellbore 32 by means of a threaded connection.

An axially extending generally tubular intermediate housing member 88 is threadably and sealably connected to upper connecter 86. An axially extending generally tubular lower housing member 90 is threadably and sealably connected to intermediate housing member 88. Upper connecter 86, intermediate housing member 88 and lower housing member 90 form upper subassembly 92. Upper subassembly 92, including upper connecter 86, intermediate housing member 88 and lower housing member 90, is electrically connected to the section of drill string 30 above telemetry tool 40.

An axially extending generally tubular isolation subassembly 94 is secured and coupled in sealing relationship to lower housing member 90. Interposed between isolation subassembly 94 and lower housing member 90 is a dielectric layer 96 that provides electric isolation between lower housing member 90 and isolation subassembly 94. Dielectric layer 96 is composed of a dielectric material, such as teflon, chosen for its dielectric properties and capably of withstanding compression loads without extruding.

An axially extending generally tubular lower connecter 98 is securably and sealably coupled to isolation subassembly 94. Disposed between lower connecter 98 and isolation subassembly 94 is a dielectric layer 100 that electrically isolates lower connecter 98 from isolation subassembly 94. Lower connecter 98 is adapted to threadably and sealably connect to drill string 30 and is electrically connected to the portion of drill string 30 below telemetry tool 40.

Isolation subassembly 94 provides a discontinuity in the electrical connection between lower connecter 98 and upper subassembly 92 of telemetry tool 40, thereby providing a discontinuity in the electrical connection between the portion of drill string 30 below telemetry tool 40 and the portion of drill string 30 above telemetry tool 40.

It should be apparent to those skilled in the art that the use of directional terms such as above, below, upper, lower, upward, downward, etc. are used in relation to the illustrative embodiments as they are depicted in the figures, the upward direction being toward the top of the corresponding figure and the downward direction being toward the bottom of the corresponding figure. It is to be understood that telemetry tool 40 may be operated in vertical, horizontal, inverted or inclined orientations without deviating from the principles of the present invention.

Mandrel 84 includes axially extending generally tubular upper mandrel section 102 and axially extending generally tubular lower mandrel section 104. Upper mandrel section 102 is partially disposed and sealing configured within upper connecter 86. A dielectric member 106 electrically isolates upper mandrel section 102 from upper connecter 86. The external surface of upper mandrel section 102 has a dielectric layer disposed thereon. Dielectric layer 108 may be, for example, a teflon layer. Together, dielectric layer 108 and dielectric member 106 serve to electrically isolate upper connecter 86 from upper mandrel section 102.

Between upper mandrel section 102 and lower mandrel section 104 is a dielectric member 110 that, along with dielectric layer 108 serves to electrically isolate upper mandrel section 102 from lower mandrel section 104. Between lower mandrel section 104 and lower housing member 90 is a dielectric member 112. On the external surface of lower mandrel section 104 is a dielectric layer 114 which, along with dielectric member 112 provide for electric isolation of lower mandrel section 104 from lower housing member 90. Dielectric layer 114 also provides for electric isolation between lower mandrel section 104 and isolation subassembly 94 as well as between lower mandrel section 104 and lower connecter 98. Lower end 116 of lower mandrel section 104 is disposed within lower connecter 98 and is in electrical communication with lower connecter 98.

Intermediate housing member 88 of external housing 82 and upper mandrel section 102 of mandrel 84 define annular area 118. An electronics package 122 and a transmitter 124 are disposed within annular area 118. In operation, a telemetry tool 40 will generate ULF electromagnetic wave fronts 42 as a course means for determining the location of telemetry tool 40 in wellbore 30 as described with reference to FIG. 1. Information relating to the current draw of ULF electromagnetic wave fronts 42 is sent to electronics package 122 via electrical conductor 128. ULF electromagnetic wave fronts 42 may also be used to generate an electromagnetic output signal that carries the resistivity information as well as other information through the earth that may be picked up by electromagnetic pickup device 60. Once telemetry tool 40 is generally positioned in the correct downhole location, telemetry tool 40 may generate VLF electromagnetic waves 46 to more precisely determine downhole position. Information relating to the current draw within telemetry tool 40 is then sent to electronics package 122 via electrical conductor 128. This information may be forwarded to the surface using ULF electromagnetic wave fronts 42 for transmission. Thus, telemetry tool 40 of the present invention may use ULF electromagnetic wave fronts 42 to determine course downhole position and to transmit information to the surface using a relatively small amount of power. Additionally, telemetry tool 40 of the present invention may determine precise downhole position using VLF waves 46.

In addition to using telemetry tool 40 of the present invention to identify a specific downhole location in comparison to a resistivity log, downhole telemetry tool 40 of the present invention may be used to generate a resistivity log. In such a case, telemetry tool 40 will operate as drill string 30 is tripped into or out of wellbore 32. The current draw information from transmitter 124 is fed to electronics package 122 via electrical conductor 128. For logging, telemetry tool 40 may be operated at any suitable frequency, however, the use of a higher frequency in the VLF range, for example, will yield a resistivity log with greater sensitivity.

Figure 4:
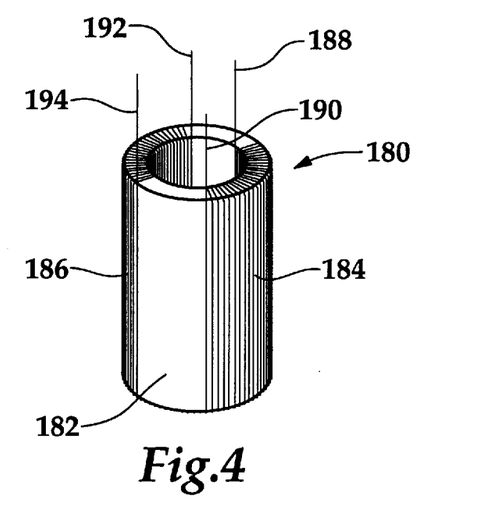
FIG. 4 is a schematic illustration of a toroid with primary and secondary windings for utilization with one embodiment of the present invention.

Referring now to FIG. 4, a schematic illustration of a toroid suitable for use in one embodiment of the invention is depicted and generally designated 180. Toroid 180 includes magnetically permeable annular core 182, a plurality of electrical conductor windings 184 and a plurality of electrical conductor windings 186. Windings 184 and windings 186 are each wrapped around annular core 182. Collectively, annular core 182, windings 184 and windings 186 serve to approximate an electrical transformer wherein either windings 184 or windings 186 may serve as the primary or the secondary of the transformer.

In one embodiment, the ratio of primary windings to secondary windings is 2:1. For example, the primary windings may include 100 turns around annular core 182 while the secondary windings may include 50 turns around annular core 182. In another embodiment, the ratio of secondary windings to primary windings is 4:1. For example, primary windings may include 10 turns around annular core 182 while secondary windings may include 40 turns around annular core 182. It will be apparent to those skilled in the art that the ratio of primary windings to secondary windings as well as the specific number of turns around annular core 182 will vary based upon factors such as the diameter and height of annular core 182, the desired voltage, current and frequency characteristics associated with the primary windings and secondary windings and the desired magnetic flux density generated by the primary windings and secondary windings.

Toroid 180 of the present invention may serve as transmitter 124 of the telemetry tool 40 as described with reference to FIG. 3A. Windings 184 have a first end 188 and a second end 190. First end 188 of windings 184 is electrically connected to electronics package 122. Windings 184 serve as the primary wherein first end 188 of windings 184, receives an electrical signal from electronics package 122 via electrical conductor 128. Second end 190 of windings 184 is electrically connected to upper subassembly 92 of external housing 82 which serves as a ground.

Windings 186 of toroid 180 have a first end 192 and a second end 194. First end 192 of windings 186 is electrically connected to upper subassembly 92 of external housing 82.

Second end 194 of windings 186 is electrically connected to lower connecter 98 of external housing 82. First end 192 of windings 186 is thereby separated from second end 192 of windings 186 by isolations subassembly 94 which prevents a short between first end 192 and second end 194 of windings 186. The current supplied from electronics package 122 feeds windings 184, the primary, such that a current is induced in windings 186, the secondary. The current in windings 186 induces an axial current on drill string 30, thereby producing electromagnetic waves such as ULF waves 42 and VLF waves 46.

Figure 5:
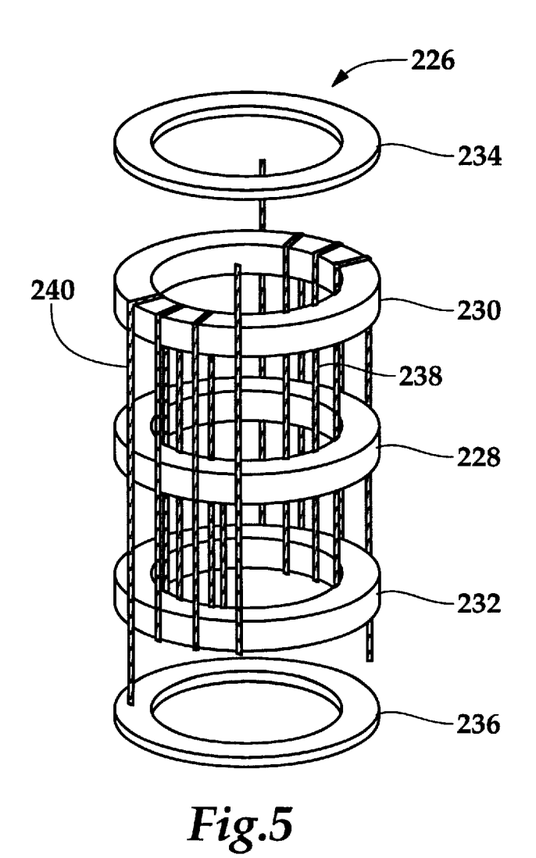
FIG. 5 is an exploded view of a toroid with primary and secondary windings for utilization as a transmitter or receiver in connection with one embodiment of the present invention.

Referring now to FIG. 5, an exploded view of a toroid assembly 226 is depicted. Toroid assembly 226 may to serve as transmitter 124 of telemetry tool 40 of FIG. 3A. Toroid assembly 226 includes a magnetically permeable core 228, an upper winding cap 230, a lower winding cap 232, an upper protective plate 234 and a lower protective plate 236. Winding caps 230, 232 and protective plates 234, 236 are formed from a dielectric material such as fiberglass or phenolic. Windings 238 are wrapped around core 228 and winding caps 230, 232 by inserting windings 238 into a plurality of slots 240 which, along with the dielectric material, prevent electrical shorts between the turns of winding 238. For illustrative purposes, only one set of winding, windings 238, have been depicted. It will be apparent to those skilled in the art that, in operation, a primary and a secondary set of windings will be utilized by toroid assembly 226.

As should be apparent from FIG. 5, the number of magnetically permeable cores such as core 228 may be varied, dependent upon the required length for the toroid. In addition, as will be known by those skilled in the art, the number of cores 228 will be dependent upon the diameter of the cores as well as the desired voltage, current and frequency carried by primary windings 238 and secondary windings 240.

Figure 6:
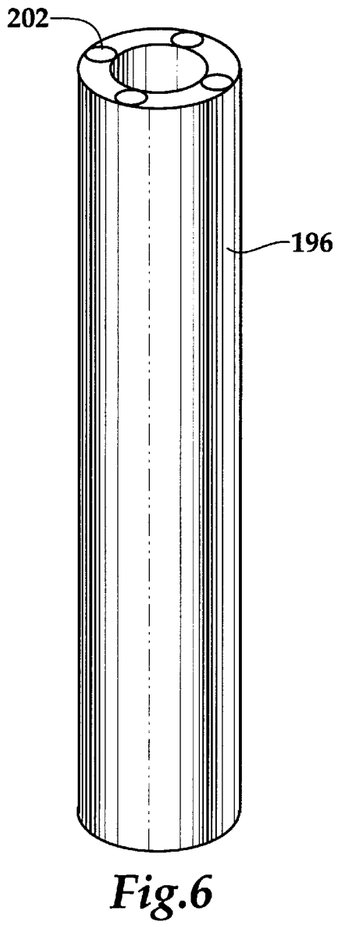
FIG. 6 is a perspective view of an annular carrier for a telemetry tool of the present invention.
Figure 7:
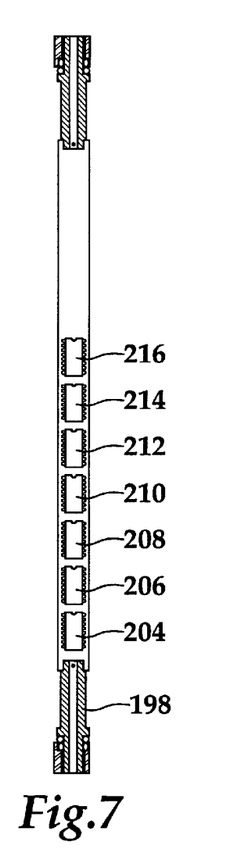
FIG. 7 is a perspective view of an electronics package or member including a plurality of electronic devices incorporated therein for use in connection with the invention.
Figure 8:
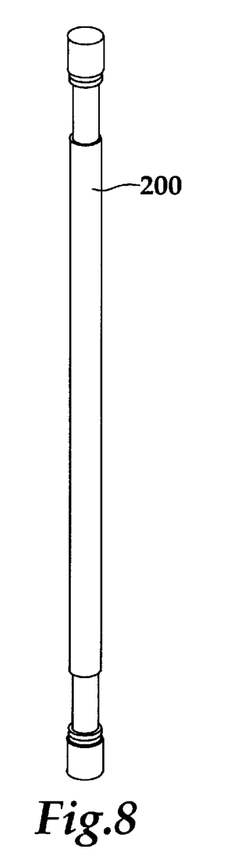
FIG. 8 is a perspective view of a battery pack for powering the telemetry tool of the present invention.

Referring now to FIGS. 6, 7 and 8, the components of electronics package 122 of the present invention are illustrated. Electronics package 122 includes an annular carrier 196, an electronics member 198 and one or more battery packs 200. Annular carrier 196 is disposed between external housing 82 and mandrel 84. Annular carrier 196 includes a plurality of axial openings 202 for receiving either electronics member 198 or battery packs 200.

Even though FIG. 6 depicts four axial openings 202, it should be understood by one skilled in the art that the number of axial openings in annular carrier 196 may be varied. Specifically, the number of axial openings 202 will be dependent upon the number of battery packs 200 which will be required for a specific implementation of the telemetry tool 40 of the present invention.

Electronics member 198 is configured for insertion into an axial opening 202 of annular carrier 196. Electronics member 198 receives current draw information from first end 188 of windings 184. Electronics member 198 includes a plurality of electronic devices such as a current sensor 204, a preamplifier 206, a filter 208, a sample and hold circuit 210, an analog to digital converter 212, a memory device 214 and an amplifier 216.

Battery packs 200 are sized for insertion into axial openings 202 of axial carrier 196. Battery packs 200, which includes batteries such as nickel cadmium batteries or lithium batteries, are configured to provide the proper operating voltage and current to the electronic devices of electronics member 198 and to for example toroid 180 of FIG. 4.

Even though FIGS. 6–8 have described electronics package 122 with reference to annular carrier 196, it will be appreciated that a variety of configurations may be used for the construction of electronics package 122. For example, electronics package 122 may be positioned concentrically within mandrel 84 using several stabilizers and having a narrow, elongated shape such that a minimum resistance will be created by electronics package 122 to the flow of fluids within drill string 30.

Figure 9:
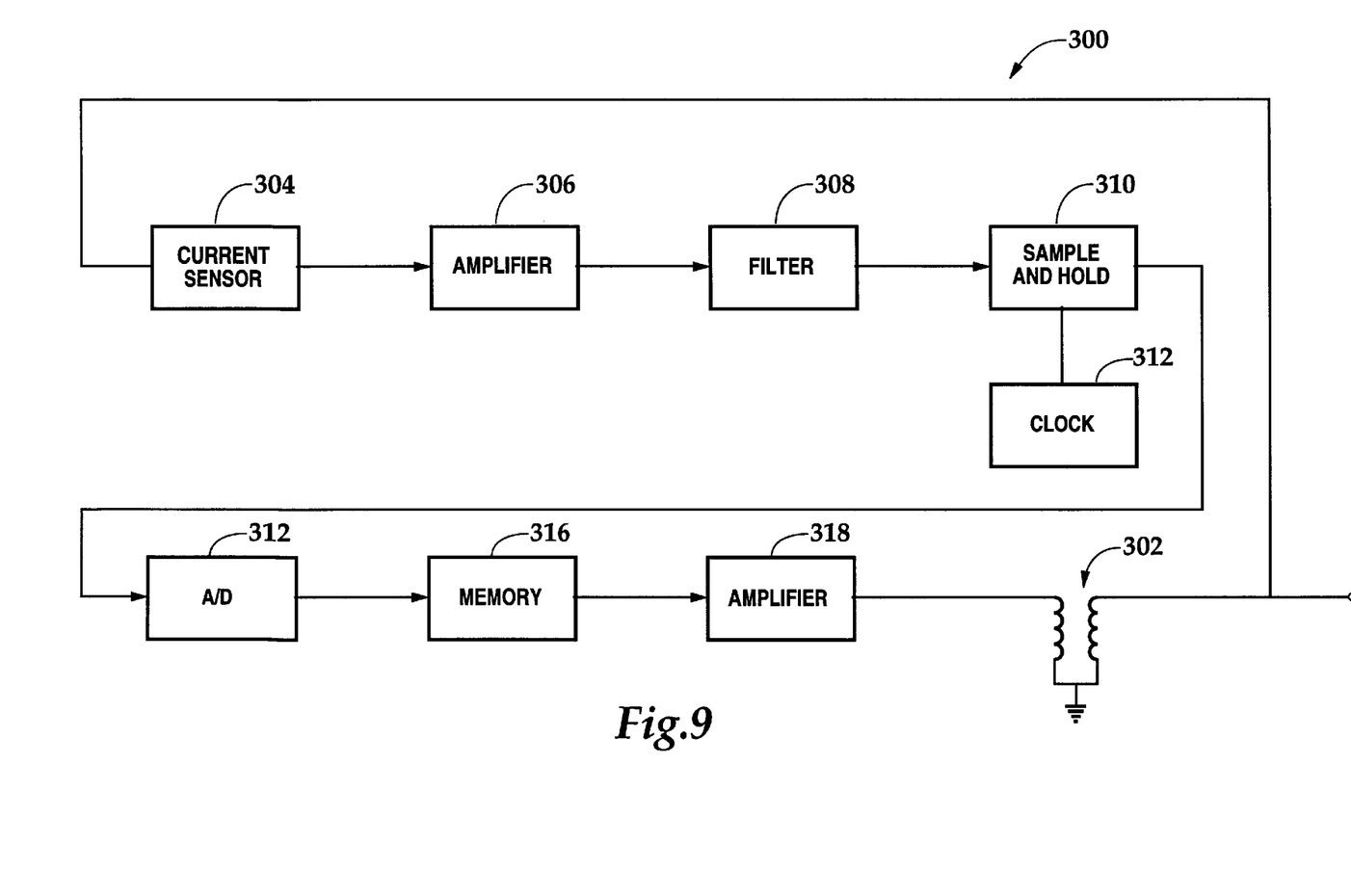
FIG. 9 is a block diagram schematically illustrating signal processing in accordance with one embodiment of the method and apparatus of the invention.

FIG. 9 is a block diagram schematically illustrating one embodiment of the method utilized in the practice of the present invention and is generally designated 300. Electromagnetic transmitter 302 is used to generate electromagnetic waves such as ULF electromagnetic waves 42 and VLF electromagnetic waves 46. The current drawn by electromagnetic transmitter 302 is fed back to a current sensor 304. An electrical signal from current sensor 304 is then amplified in amplifier 306 and filtered in filter 308 prior to entering sample and hold circuit 310. Sample and hold circuit 310 monitors the current draw at predetermined intervals determined by precision clock 312. The information obtained in sample and hold circuit 310 is passed to analog to digital converter 314 and into memory device 316 for storage. The current draw information may then be forwarded to amplifier 318 prior to transmission to the surface by electromagnetic transmitter 302. Method 300 may operate on a continuous basis which would be suitable for a logging operation. Alternatively, method 300 may be used as needed to determine the position of electromagnetic transmitter 302 within wellbore 30.

While the invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. For example while the apparatus of the present invention is illustrated and described in connection with offshore oil production, it should be understood by one skilled in the art that the invention is equally well-suited for operation in an onshore environment. It is, therefore, intended that the appended claims encompass any such modifications or embodiments.

What is claimed is:

1. A method of positioning a downhole tool in a wellbore comprising the steps of:

disposing an electromagnetic transmitter in the wellbore;

transmitting electromagnetic waves into the earth surrounding the wellbore;

measuring the current draw by the electromagnetic transmitter;

determining the resistivity of the earth surrounding the wellbore based upon the current draw; and comparing the resistivity of the earth surrounding the wellbore with known resistivity to determine the position of the downhole tool in the wellbore.

2. The method as recited in claim 1 wherein the step of disposing an electromagnetic transmitter in the wellbore further includes tripping the electromagnetic transmitter into the wellbore as a part of a pipe string.

3. The method as recited in claim 1 wherein the step of disposing an electromagnetic transmitter in the wellbore further includes running the electromagnetic transmitter in the wellbore on a wireline.

4. The method as recited in claim 1 further including the steps of generating a current using a power supply and sending the current to the electromagnetic transmitter.

5. The method as recited in claim 1 wherein the step of transmitting electromagnetic waves into the earth further comprises transmitting the electromagnetic waves in the ultra low frequency range.

6. The method as recited in claim 1 wherein the step of transmitting electromagnetic waves into the earth further comprises transmitting the electromagnetic waves in the very low frequency range.

7. The method as recited in claim 1 wherein the step of measuring the current draw by the electromagnetic transmitter further includes detecting the current draw with a current sensing device and sampling current draw in a sample and hold circuit.

8. The method as recited in claim 1 further including the step of storing information relating to the current draw in a memory device.

9. The method as recited in claim 1 further including the step of propagating the electromagnetic waves carrying information relating to the current draw to the surface.

10. A method of generating a resistivity log for a wellbore comprising the steps of:

tripping an electromagnetic transmitter through at least a portion of the wellbore;

transmitting electromagnetic waves into the earth surrounding the wellbore;

measuring the current draw by the electromagnetic transmitter; and determining the resistivity of the earth surrounding the wellbore based upon the current draw.

11. The method as recited in claim 10 wherein the step of tripping an electromagnetic transmitter through at least a portion of the wellbore further includes tripping the electromagnetic transmitter into the wellbore.

12. The method as recited in claim 10 wherein the step of tripping an electromagnetic transmitter through at least a portion of the wellbore further includes tripping the electromagnetic transmitter out of the wellbore.

13. The method as recited in claim 10 wherein the step of tripping an electromagnetic transmitter through at least a portion of the wellbore further includes disposing the electromagnetic transmitter on a wireline.

14. The method as recited in claim 10 further including the steps of generating a current using a power supply and sending the current to the electromagnetic transmitter.

15. The method as recited in claim 10 wherein the step of transmitting electromagnetic waves into the earth further comprises transmitting the electromagnetic waves in the ultra low frequency range.

16. The method as recited in claim 10 wherein the step of transmitting electromagnetic waves into the earth further comprises transmitting the electromagnetic waves in the very low frequency range.

17. The method as recited in claim 10 wherein the step of measuring the current draw by the electromagnetic transmitter further includes detecting the current draw with a current sensing device and sampling current draw in a sample and hold circuit.

18. The method as recited in claim 10 further including the step of storing information relating to the current draw in a memory device.

19. The method as recited in claim 10 further including the step of propagating the electromagnetic waves carrying information relating to the current draw to the surface.

* * * * *